US010969855B2

United States Patent
Jung et al.

(10) Patent No.: US 10,969,855 B2
(45) Date of Patent: *Apr. 6, 2021

(54) METHOD OF OPERATING SEMICONDUCTOR DEVICE

(71) Applicant: Samsung Electronics Co., Ltd., Gyeonggi-do (KR)

(72) Inventors: Hyo-Sang Jung, Gyeonggi-do (KR); Sang-Wook Ju, Gyeonggi-do (KR); Jung-Hun Heo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 102 days.

This patent is subject to a terminal disclaimer.

(21) Appl. No.: 16/284,698

(22) Filed: Feb. 25, 2019

(65) Prior Publication Data

US 2019/0187769 A1    Jun. 20, 2019

Related U.S. Application Data

(63) Continuation of application No. 14/959,824, filed on Dec. 4, 2015, now Pat. No. 10,254,813.

(30) Foreign Application Priority Data

Dec. 4, 2014    (KR) .................. 10-2014-0173175

(51) Int. Cl.
*G06F 1/00* (2006.01)
*G06F 1/324* (2019.01)
(Continued)

(52) U.S. Cl.
CPC ............ *G06F 1/324* (2013.01); *G06F 1/3243* (2013.01); *G06F 1/3287* (2013.01); *G06F 9/46* (2013.01);
(Continued)

(58) Field of Classification Search
CPC .............................. G06F 1/324; G06F 1/3287
(Continued)

(56) References Cited

U.S. PATENT DOCUMENTS 7,243,250 B2    7/2007  Ueda
7,398,414 B2 *  7/2008  Sherburne, Jr. ........ G06F 1/3203
                                                   713/600
(Continued)

FOREIGN PATENT DOCUMENTS

JP    2000347762    12/2000
JP    2004326153    11/2004
(Continued)

OTHER PUBLICATIONS

Resve Saleh et al., "System-on-Chip: Reuse and Integration", Proceedings of the IEEE, vol. 94, No. 6, Jun. 2006, pp. 1050-1069.
(Continued)

*Primary Examiner* — Volvick Derose
(74) *Attorney, Agent, or Firm* — The Farrell Law Firm, P.C.

(57) ABSTRACT

System on chip including plurality of processors including first and second processors; plurality of intellectual properties (IPs) including first and second IPs; memory interface; internal clock circuit to receive reference clock signal, generate first internal clock signal, and provide first internal clock signal to first IP; memory interface clock circuit to receive reference clock signal, generate memory interface clock signal, and provide memory interface clock signal to memory interface; and power management unit (PMU), wherein first internal clock signal drives first IP, memory interface clock signal drives memory interface, PMU generates first control signal based on operational states of plurality of processors, and provides first control signal to internal clock circuit, PMU generates second control signal
(Continued)

based on operational states of plurality of processors, and provides second control signal to memory interface clock circuit, internal clock circuit sets clock rate of first internal clock signal based on first control signal, and memory interface clock circuit sets clock rate of memory interface clock signal based on second control signal.

20 Claims, 8 Drawing Sheets

(51) Int. Cl.
    *G06F 1/3287*     (2019.01)
    *G06F 1/3234*     (2019.01)
    *G06F 9/46*     (2006.01)
    *G06F 1/3203*     (2019.01)
    *G06F 1/3237*     (2019.01)

(52) U.S. Cl.
    CPC .......... *G06F 1/3203* (2013.01); *G06F 1/3237* (2013.01); *Y02D 10/00* (2018.01); *Y02D 30/50* (2020.08)

(58) Field of Classification Search
    USPC ....................................................... 713/322
    See application file for complete search history.

(56) References Cited

U.S. PATENT DOCUMENTS

| | | | |
|---|---|---|---|
| 7,539,878 B2 | 5/2009 | Vaglica | |
| 7,882,376 B2 | 2/2011 | Ozawa | |
| 7,991,992 B2* | 8/2011 | Guan | G06F 1/3203 713/100 |
| 8,190,935 B2* | 5/2012 | Hitaka | G06F 1/08 713/322 |
| 8,281,171 B2 | 10/2012 | Tang | |
| 8,347,130 B2 | 1/2013 | Park | |
| 9,075,608 B2* | 7/2015 | Finch | G06F 1/3287 |
| 2002/0184547 A1* | 12/2002 | Francis | G06F 1/3243 713/322 |
| 2003/0210247 A1* | 11/2003 | Cui | G06F 1/3296 345/534 |
| 2004/0199803 A1* | 10/2004 | Suzuki | G06F 1/3275 713/400 |
| 2004/0230754 A1* | 11/2004 | Gumm | G06F 13/16 711/147 |
| 2005/0034002 A1* | 2/2005 | Flautner | G06F 1/3296 713/322 |
| 2005/0108591 A1* | 5/2005 | Mendelson | G06F 1/3203 713/500 |
| 2005/0278561 A1* | 12/2005 | Seo | G06F 1/32 713/322 |
| 2006/0174142 A1* | 8/2006 | Lin | G06F 1/3203 713/300 |
| 2007/0182475 A1* | 8/2007 | Shimazaki | G06F 1/10 327/295 |
| 2007/0220289 A1* | 9/2007 | Holle | G06F 1/3203 713/300 |
| 2008/0104434 A1* | 5/2008 | May | G06F 1/3203 713/322 |
| 2008/0140879 A1 | 6/2008 | Lee et al. | |
| 2008/0244491 A1* | 10/2008 | Ganesan | G06F 30/3312 716/100 |
| 2009/0150602 A1* | 6/2009 | Sauber | G06F 1/3203 711/105 |
| 2009/0204832 A1* | 8/2009 | Ma | G06F 1/3275 713/322 |
| 2010/0031209 A1* | 2/2010 | Luan | G06F 30/3312 716/113 |
| 2010/0037038 A1* | 2/2010 | Bieswanger | G06F 1/329 712/220 |
| 2010/0162019 A1* | 6/2010 | Kumar | H04N 5/63 713/323 |
| 2010/0205468 A1* | 8/2010 | Kim | G06F 1/3203 713/322 |
| 2011/0185126 A1* | 7/2011 | Sasaki | G06F 12/0837 711/124 |
| 2011/0213991 A1* | 9/2011 | Wolfe | G06F 9/5094 713/300 |
| 2011/0276812 A1* | 11/2011 | Lee | G06F 1/3203 713/300 |
| 2011/0314314 A1* | 12/2011 | Sengupta | G06F 1/3228 713/323 |
| 2012/0054511 A1* | 3/2012 | Brinks | G06F 1/26 713/310 |
| 2012/0095607 A1* | 4/2012 | Wells | G06F 1/3203 700/291 |
| 2012/0117363 A1* | 5/2012 | Cummings | H04W 48/16 713/1 |
| 2013/0007413 A1* | 1/2013 | Thomson | G06F 1/3296 712/30 |
| 2013/0083611 A1* | 4/2013 | Ware | G06F 3/0673 365/191 |
| 2013/0111120 A1* | 5/2013 | Ananthakrishnan | G06F 13/4068 711/105 |
| 2013/0147526 A1* | 6/2013 | Kim | H03K 21/00 327/115 |
| 2013/0166832 A1* | 6/2013 | Peng | G06F 3/0629 711/103 |
| 2013/0198545 A1* | 8/2013 | Lee | G06F 1/3243 713/323 |
| 2014/0064420 A1* | 3/2014 | Ling | H04L 12/40136 375/354 |
| 2014/0089697 A1* | 3/2014 | Kim | G06F 1/26 713/320 |
| 2014/0129858 A1* | 5/2014 | Varma | G06F 1/324 713/322 |
| 2014/0132340 A1* | 5/2014 | Finch | G06F 1/3287 327/564 |
| 2014/0173297 A1* | 6/2014 | Varma | G06F 1/324 713/300 |
| 2014/0181351 A1* | 6/2014 | Fatemi | G06F 13/364 710/313 |
| 2014/0181537 A1* | 6/2014 | Manne | G06F 1/324 713/300 |
| 2014/0258760 A1* | 9/2014 | Wells | G06F 1/28 713/330 |
| 2014/0281616 A1* | 9/2014 | Moran | G06F 1/3234 713/323 |
| 2015/0026495 A1* | 1/2015 | Jain | G06F 1/3243 713/323 |
| 2015/0082060 A1* | 3/2015 | Persson | G06F 1/3287 713/322 |
| 2015/0108591 A1 | 4/2015 | Takizawa | |
| 2015/0143141 A1* | 5/2015 | Echeverri Escobar | G06F 1/3243 713/320 |
| 2015/0180540 A1* | 6/2015 | Logvinov | G06F 1/3209 375/257 |
| 2015/0205344 A1* | 7/2015 | Diefenbaugh | G06F 1/3246 713/320 |
| 2015/0296452 A1* | 10/2015 | Hu | H04L 7/0331 375/376 |
| 2015/0317762 A1* | 11/2015 | Park | G06T 1/20 345/505 |
| 2015/0323975 A1* | 11/2015 | Ambapuram | G06F 1/3243 710/308 |
| 2016/0041775 A1* | 2/2016 | Hanson | G06F 3/0653 711/169 |

FOREIGN PATENT DOCUMENTS

| | | |
|---|---|---|
| JP | 20093655 | 1/2009 |
| JP | 2011198044 | 10/2011 |

(56) References Cited

FOREIGN PATENT DOCUMENTS

OTHER PUBLICATIONS

Xiaotao Chang et al., "Adaptive Clock Gating Technique for Low Power IP Core in SoC Design", 2007 IEEE, 4 pages.

* cited by examiner

METHOD OF OPERATING SEMICONDUCTOR DEVICE

PRIORITY

This continuation application claims priority under 35 U.S.C. § 120 to U.S. patent application Ser. No. 14/959,824, filed on Dec. 4, 2015 in the United States Patent and Trademark Office, which claimed priority under 35 U.S.C. § 119(a) to Korean Patent Application No. 10-2014-0173175, filed on Dec. 4, 2014 in the Korean Intellectual Property Office, the content of each of which is incorporated herein by reference in its entirety.

BACKGROUND

1. Field of the Disclosure

The present disclosure relates generally to a method of operating a semiconductor device, and more particularly to minimizing power consumption in a mobile or portable device.

2. Description of the Related Art

The battery life of a mobile or portable device, in which a mobile telecommunications system on chip (hereinafter, "mobile SoC") is used, is closely related to the amount of power consumed by the mobile SoC. Thus, there is a need for systems, apparatuses, and methods that minimize the power consumed by the mobile SoC when the mobile SoC is neither completely powered on nor completely powered off, such as when the mobile device is in standby mode. Hereinafter, "standby mode" or "standby" may mean any state of the mobile SoC that is neither completely powered on nor completely powered off.

SUMMARY

An aspect of the present disclosure provides a method of operating a semiconductor device so that the standby power of a mobile SoC is minimized.

In one aspect of the present disclosure, an SoC is provided. The SoC includes a plurality of processors including a first processor and a second processor; a plurality of intellectual properties (IPs) including a first IP and a second IP; a memory interface; an internal clock circuit configured to receive a reference clock signal, generate a first internal clock signal, and provide the first internal clock signal to the first IP; a memory interface clock circuit configured to receive the reference clock signal, generate a memory interface clock signal, and provide the memory interface clock signal to the memory interface; and a power management unit (PMU), wherein the first internal clock signal drives the first IP, the memory interface clock signal drives the memory interface, the PMU generates a first control signal based on operational states of the plurality of processors, and provides the first control signal to the internal clock circuit, the PMU generates a second control signal based on the operational states of the plurality of processors, and provides the second control signal to the memory interface clock circuit, the internal clock circuit sets a clock rate of the first internal clock signal based on the first control signal, and the memory interface clock circuit sets a clock rate of the memory interface clock signal based on the second control signal.

In another aspect of the present disclosure, an SoC is provided. The SoC includes a plurality of processors including a first processor and a second processor; a plurality of IPs including a first IP and a second IP; a memory interface; a PMU; an internal clock circuit configured to receive a reference clock signal, generate a first internal clock signal, and provide the first internal clock signal to the first IP; and a memory interface clock circuit configured to receive the reference clock signal, generate a memory interface clock signal, and provide the memory interface clock signal to the memory interface, wherein the first internal clock signal drives the first IP, the memory interface clock signal drives the memory interface, when an operating state of each of the plurality of processors is idle, the first internal clock signal is set to have a first clock rate that is a minimum clock rate for minimizing a standby power of the first IP.

In still another aspect of the present disclosure, an SoC is provided. The SoC includes a plurality of processors; a first IP; a PMU; and an internal clock circuit configured to receive a reference clock signal, generate a first internal clock signal, and provide the first internal clock signal to the first IP, wherein the PMU is configured to generate a first control signal based on operating states of the plurality of processors, and provide the first control signal to the internal clock circuit, wherein the first control signal indicates a clock rate for the first internal clock signal, and the internal clock circuit is further configured to set the clock rate of the first internal clock signal based on the first control signal.

The present disclosure is generally directed to power management of a system on a chip (SoC) and, more particularly, to reducing power consumption by reducing the rate of the clock signal driving one or more ancillary components on the SoC (such as, for example, memory interfaces and IPs) when the primary components (i.e., cores/processors) associated with those ancillary components are in a lower power mode, such as idle or standby.

BRIEF DESCRIPTION OF THE DRAWINGS

The above and other aspects, features and advantages of the present disclosure will become more apparent by describing in detail embodiments thereof with reference to the attached drawings in which.

DETAILED DESCRIPTION OF EMBODIMENTS OF THE PRESENT DISCLOSURE

Figure 1:
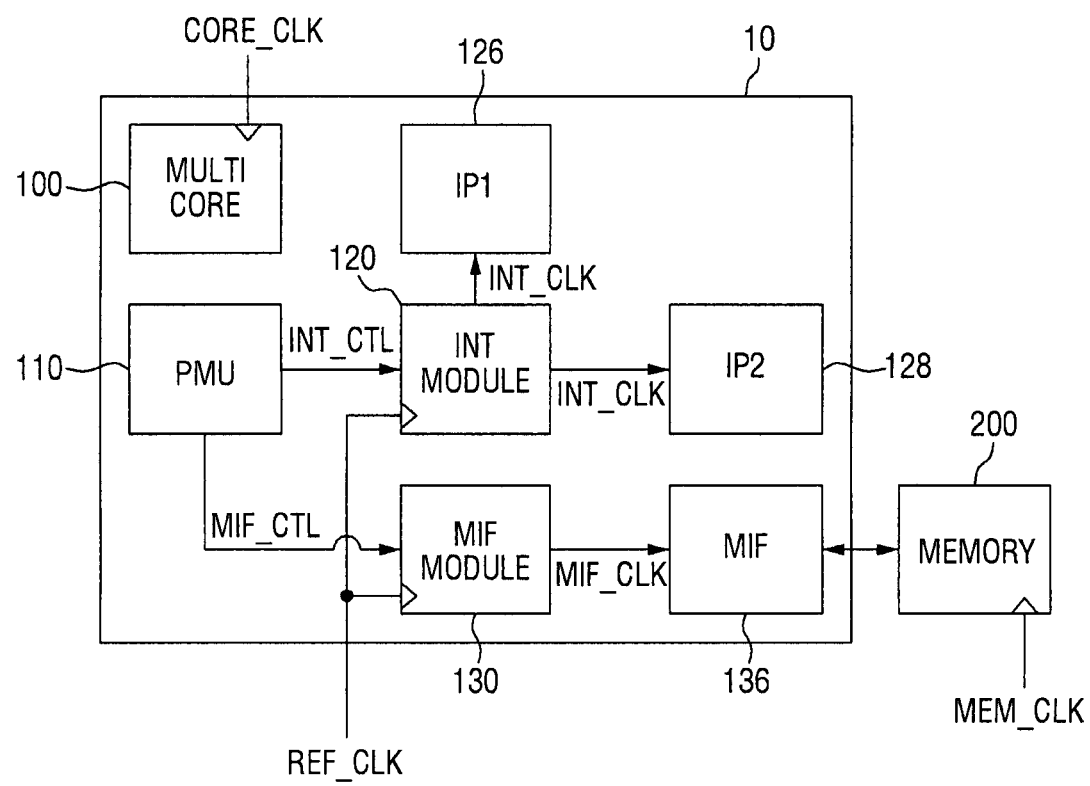
FIG. 1 is a schematic diagram of a system on a chip (SoC) according to an embodiment of the present disclosure.

Embodiments of the present disclosure are described below in detail with reference to the accompanying drawings. The disclosure, however, may be embodied in various different forms, and should not be construed as being limited only to the illustrated embodiments. Rather, these embodiments are provided as examples so that this disclosure will be thorough and complete, and so that this disclosure will fully convey the concept of the disclosure to those skilled in the art. Processes, elements, and techniques known to those of ordinary skill in the art may not be described with respect to some of the embodiments of the disclosure. Like reference numerals may denote like elements throughout the attached drawings and written description. Where possible and/or convenient, descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections are not limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

Spatially relative terms, such as "beneath", "below", "lower", "under", "above", "upper" and the like, may be used herein for ease of description to describe one element/feature's relationship to another element(s)/feature(s) as illustrated in the drawings. It will be understood that the spatially relative terms are intended to encompass different orientations in addition to the orientation depicted in the figures. Moreover, it should be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

The terminology used herein is only for the purpose of describing particular examples and/or embodiments and is not intended to limit the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components, etc., but do not preclude the presence or addition of one or more other features, integers, steps, operations, elements, components, groups thereof, etc. As used herein, the term "and/or" includes any and all combinations of one or more of the associated listed items.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and/or the present specification and should not be interpreted in an idealized or overly formal sense unless expressly so defined herein.

FIG. 1 is a schematic diagram of a system on a chip (SoC) 10 according to an embodiment of the present disclosure. SoC 10 may be included in a semiconductor device according to an embodiment of the present disclosure. In several embodiments of the present disclosure, the SoC 10 may be a mobile SoC.

The SoC 10 includes a multi-core 100, a power management unit (PMU) 110, an internal (INT) clock module 120, and a memory interface (MIF) clock module 130. It is noted that each of the modules herein is a component than can also be, for example, a unit or circuit.

The multi-core 100 is operated by core clock CORE_CLK to generally control the SoC 10 and includes a plurality of cores. In several embodiments of the present disclosure, the multi-core 100 may be a multi-processor including a plurality of central processing units (CPUs). In several embodiments of the present disclosure, the multi-core 100 may also include a graphic processing unit (GPU) or a general purpose GPU (GPGPU).

The PMU 110 manages power of the SoC 10. As will be described below, the PMU 110 is involved in adjustment of standby power of the SoC 10 by controlling the INT clock module 120 and the MIF clock module 130. The PMU 110 includes a storage region including a register, and data may be written in the storage region of the PMU 110 by software controlling the INT clock module 120 and the MIF clock module 130. The PMU 110 transmits control signals INT_CTL and MIF_CTL to the INT clock module 120 and the MIF clock module 130, respectively. This may be done according to a recording state of data in, for example, the register in the storage region.

The INT clock module 120 generates an INT clock INT_CLK for operating various IPs included in the SoC 10. Particularly, the INT clock module 120 receives a reference clock REF_CLK for driving the SoC 10. The INT clock module 120 receives the reference clock REF_CLK, generates the INT clock INT_CLK from REF-CLK, and provides the generated INT clock INT_CLK to the first IP 126 (shown as "IP1") or the second IP 128 (shown as "IP2"). Although FIG. 1 only shows the first IP 126 and the second IP 128, the number of IPs according to the present disclosure is not limited to two. The first IP 126 and the second IP 128 are operated by INT_CLK received from the INT clock module 120.

The MIF clock module 130 generates an MIF clock MIF_CLK for operating one or more memory interfaces MIFs 136 included in the SoC 10. Hereinafter, MIF 136 will be referred to in the singular for convenience; however, MIF 136 may be more than one memory interface. The MI F clock module 130 receives the reference clock REF_CLK, generates an MIF clock MIF_CLK from the received REF_CLK, and provides the generated MIF clock MIF_CLK to the memory interface 136. The memory interface 136 is operated by the MIF clock MIF_CLK to transmit/receive data with a memory 200 operated by a memory clock MEM_CLK.

Figure 2:
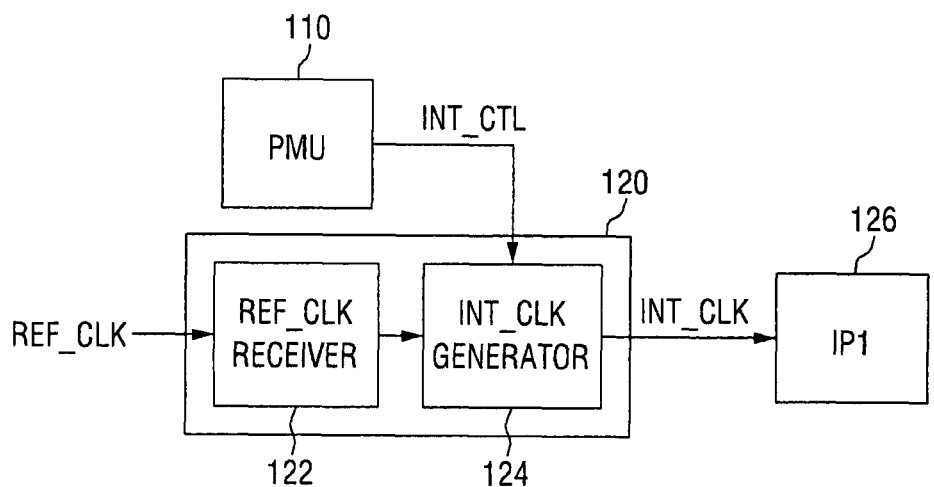
FIG. 2 is a schematic diagram of an INT clock module of an SoC according to an embodiment of the present disclosure.

FIG. 2 is a schematic diagram of an INT clock module of an SoC according to the embodiment of the present disclosure.

Referring to FIG. 2, the INT clock module 120 according to an embodiment of the present disclosure includes a reference clock receiving unit 122 and an INT clock generating unit 124.

The reference clock receiving unit 122 receives the reference clock REF_CLK, which is used generally for driving the SoC 10. In several embodiments of the present disclosure, the reference clock REF_CLK may be generated by, for example, a 24 MHz oscillator, but the present disclosure is not limited thereto.

The INT clock generating unit 124 generates the INT clock INT_CLK, which is used for operating various IPs included in the SoC 10, based on the reference clock REF_CLK. In embodiments of the present disclosure, the clock rate of the INT clock INT_CLK is higher than that of the reference clock REF_CLK. Accordingly, for example, the first IP 126 on the SoC 10 may be operated at a higher clock rate than that of the reference clock REF_CLK.

The INT clock generating unit 124 is controlled by the PMU 110. Particularly, the INT clock generating unit 124 receives a control signal INT_CTL from the PMU 110, which indicates the clock rate for the generated INT clock INT_CLK. Thus, for example, PMU 110 may transmit a control signal INT_CTL which indicates that the NT clock generating unit 124 should generate the INT clock INT_CLK at the same clock rate as that of the reference clock REF_CLK.

Figure 3:
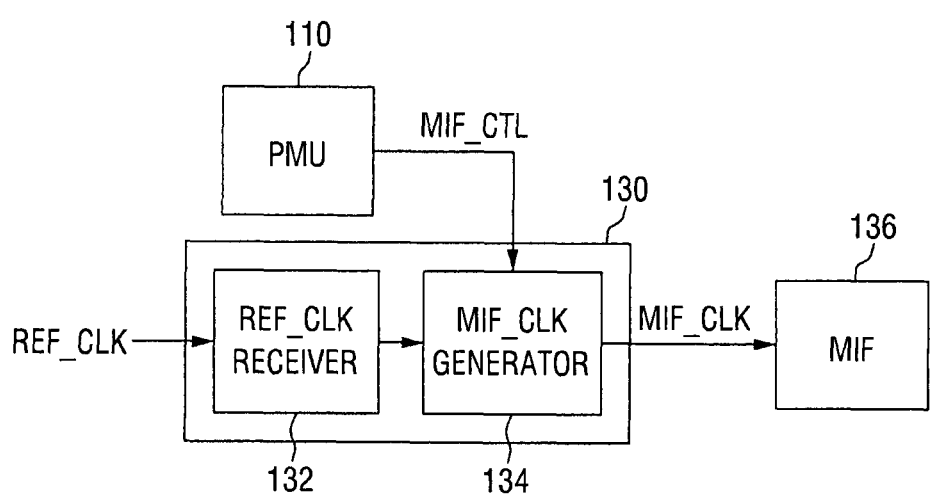
FIG. 3 is a schematic diagram of a memory interface (MIF) clock module of an SoC according to an embodiment of the present disclosure.

FIG. 3 is a schematic diagram of an MIF clock module according to an embodiment of the present disclosure.

Referring to FIG. 3, the MIF clock module 130 according to the embodiment of the present disclosure includes a reference clock receiving unit 132 and an MIF clock generating unit 134.

Similar to the reference clock receiving unit 122 of the INT clock module 120 in FIG. 2, the reference clock receiving unit 132 of the MIF clock module 130 in FIG. 3 receives the reference clock REF_CLK which drives the SoC 10.

The MIF clock generating unit 134 generates the MIF clock MIF_CLK based on the reference clock REF_CLK. In embodiments of the present disclosure, the clock rate of the MIF clock MIF_CLK is higher than that of the reference clock REF_CLK. Accordingly, for example, the memory interface 136 on the SoC 10 may be operated at a higher clock rate than that of the reference clock REF_CLK.

The MIF clock generating unit 134 is also controlled by the PMU 110. Particularly, the MIF clock generating unit 134 receives a control signal MIF_CTL from the PMU 110, which indicates the clock rate for the generated MIF clock MIF_CLK. For example, the PMU 110 may send a control signal MIF_CTL indicating that the MIF clock generating unit 134 should generate the MIF clock MIF_CLK with a clock rate which is higher than that of the reference clock REF_CLK, but lower than that of the INT clock INT_CLK.

Figure 4:
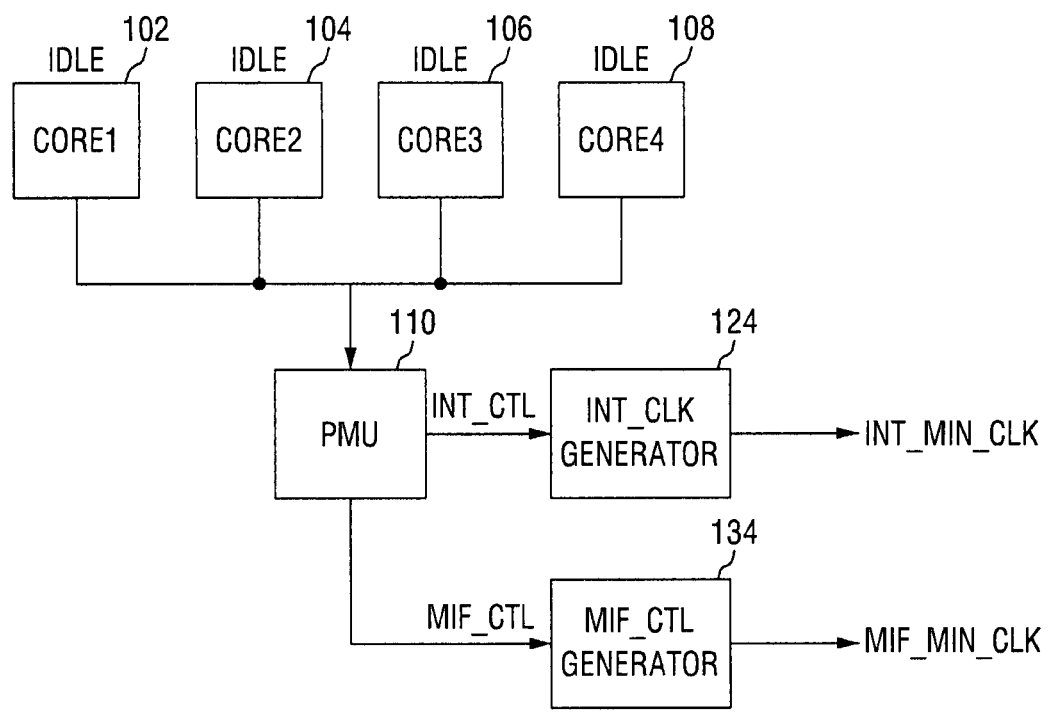
FIG. 4 is a schematic diagram of the operation of an SoC according to an embodiment of the present disclosure.

FIG. 4 is a schematic diagram of the operation of an SoC according to an embodiment of the present disclosure.

Referring to FIG. 4, when operating the SoC according to an embodiment of the present disclosure, a state of each of the plurality of cores 102, 104, 106, and 108 provided on the SoC 10 is examined. The states of the plurality of cores 102, 104, 106, and 108 may include a busy state and an idle state. The busy state includes a state in which the system on chip is in a power on mode and performs calculation, and the idle state includes a state in which the system on chip is in a power on mode, but stands by without performing calculation. Although only two states (busy or standby) are described in reference to this embodiment, the present disclosure is not limited thereto, and other embodiments may have two or more low power states or modes.

When all of the plurality of cores 102, 104, 106, and 108 are in the idle state, which is the case in FIG. 4, the INT clock generating unit 124 generates a minimum INT clock INT_MIN_CLK. Here, the minimum INT clock INT_MIN_CLK is a lower clock rate for making one or more of the IPs on the SoC 10 driven by the INT clock module 120 consume minimum power in the power on state. That is, when all of the plurality of cores 102, 104, 106, and 108 are in the idle state, the PMU 110 sends a control signal INT_CTL to INT clock module 120 indicating that the INT clock generating unit 124 should generate the minimum INT clock INT_MIN_CLK obtained by decreasing the clock rate from the clock rate of the INT clock INT_CLK.

In several embodiments of the present disclosure, the minimum INT clock INT_MIN_CLK may have the same clock rate as that of the reference clock REF_CLK, or a clock rate higher than the clock rate of the reference clock REF_CLK and lower than that of the original INT clock INT_CLK. One, more, or all of the IPs on the SoC 10 are not completely powered off when provided with the minimum INT clock INT_MIN_CLK.

Similar to the INT clock generating unit 124, when all of the plurality of cores 102, 104, 106, and 108 are in the idle state, which is the case in FIG. 4, the MIF clock generating unit 134 generates a minimum MIF clock MIF_MIN_CLK. Here, the minimum MIF clock MIF_MIN_CLK is a lower clock rate signal for allowing the memory interface 136 driven by the MIF clock module 130 to consume minimum power while still in a power on state. That is, when all of the plurality of cores 102, 104, 106, and 108 are in the idle state, the PMU 110 sends a control signal MIF_CTL to MIF clock module 120 indicating that the MIF clock generating unit 134 should generate the minimum MIF clock MIF_MIN_CLK obtained by decreasing the clock rate from the clock rate of the MIF clock MIF_CLK.

In several embodiments of the present disclosure, the minimum MIF clock MIF_MIN_CLK may have the same clock rate as that of the reference clock REF_CLK, or a clock rate higher than the clock rate of the reference clock REF_CLK and lower than that of the original MIF clock MIF_CLK. The memory interface on the SoC 10 is not completely powered off while provided with the minimum MIF clock MIF_MIN_CLK.

By the aforementioned method, it is possible to improve battery efficiency of a mobile device or a portable device in which the SoC 10 is used by minimizing standby power consumption of the SoC 10, which may be, for example, a mobile SoC, without powering off the SoC 10.

While the minimum INT clock INT_MIN_CLK or the minimum MIF clock MIF_MIN_CLK may have the same clock rate as that of the reference clock REF_CLK, in several embodiments of the present disclosure, the INT clock generating unit 124 or the MIF clock generating unit 134 may directly provide the reference clock REF_CLK received by the reference clock receiving unit 122 or reference clock receiving unit 132 to the IPs 126 and 128 or the memory interface 136, respectively.

Figure 5:
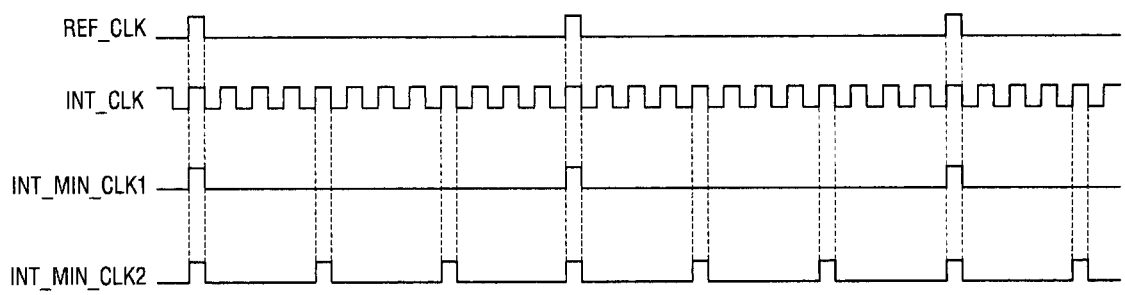
FIG. 5 is a timing diagram of INT clock signals according to an embodiment of the present disclosure.

FIG. 5 is a timing diagram of INT clock signals according to an embodiment of the present disclosure.

FIG. 5 shows the reference clock REF_CLK, the INT clock INT_CLK, a first minimum INT clock INT_MIN_CLK1, and a second minimum INT clock INT_MIN_CLK2 signals. First minimum INT clock INT_MIN_CLK1, which is generated by the INT clock generating unit 124 according to a control signal INT_CTL from the PMU 110, has the same clock rate as that of the reference clock REF_CLK. Second minimum INT clock INT_MIN_CLK2, which is generated by the INT clock generating unit 124 according to a control signal INT_CTL from the PMU 110, has a clock rate higher than that of the reference clock REF_CLK, but lower than that of the original INT clock INT_CLK.

Thus, the IPs driven by the INT clock module can consume minimum power in the power on state by receiving either the first minimum INT clock INT_MIN_CLK1 or the second minimum INT clock INT_MIN_CLK2. Which clock rate value is appropriate for minimizing the standby power of the SoC 10 may depend on, for example, the battery level, the SoC state or condition, and/or particular implementation or application.

Figure 6:
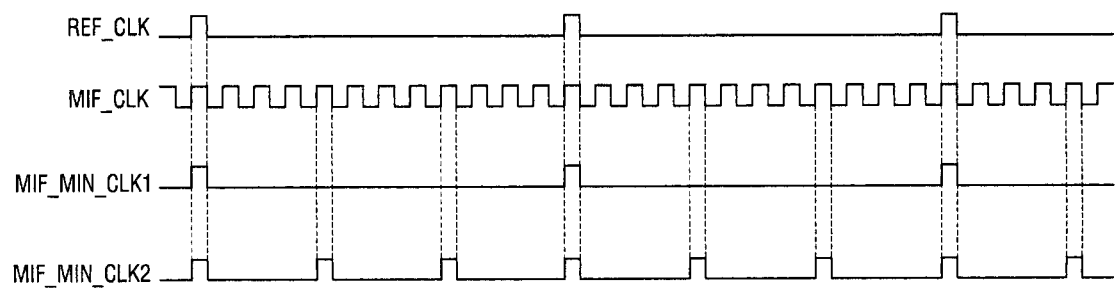
FIG. 6 is a timing diagram of MIF clock signals according to an embodiment of the present disclosure.

FIG. 6 is a timing diagram of MIF clock signals according to an embodiment of the present disclosure.

FIG. 6 shows the reference clock REF_CLK, the MIF clock MIF_CLK, a first minimum MIF clock MIF_MIN_CLK1, and a second minimum MIF clock MIF_MIN_CLK2 signals. First minimum MIF clock MIF_MIN_CLK1, which is generated by the MIF clock generating unit 134 according to a control signal MIF_CTL received from the PMU 110, has the same clock rate as that of the reference clock REF_CLK. Second minimum MIF clock MIF_MIN_CLK2, which is generated by the MIF clock generating unit 134 according to a control signal MIF_CTL received from the PMU 110, has a clock rate higher than that of the reference clock REF_CLK but lower than that of the original MIF clock MIF_CLK.

Thus, memory interface 136 driven by the MIF clock module may consume minimum power in the power on state by receiving either the first minimum MIF clock MIF_MIN_CLK1 or the second minimum MIF clock MIF_MIN_CLK2. Which clock rate value is appropriate for minimizing the standby power of the SoC 10 may depend on, for example, the battery level, the SoC state or condition, and/or the particular implementation or application.

Figure 7:
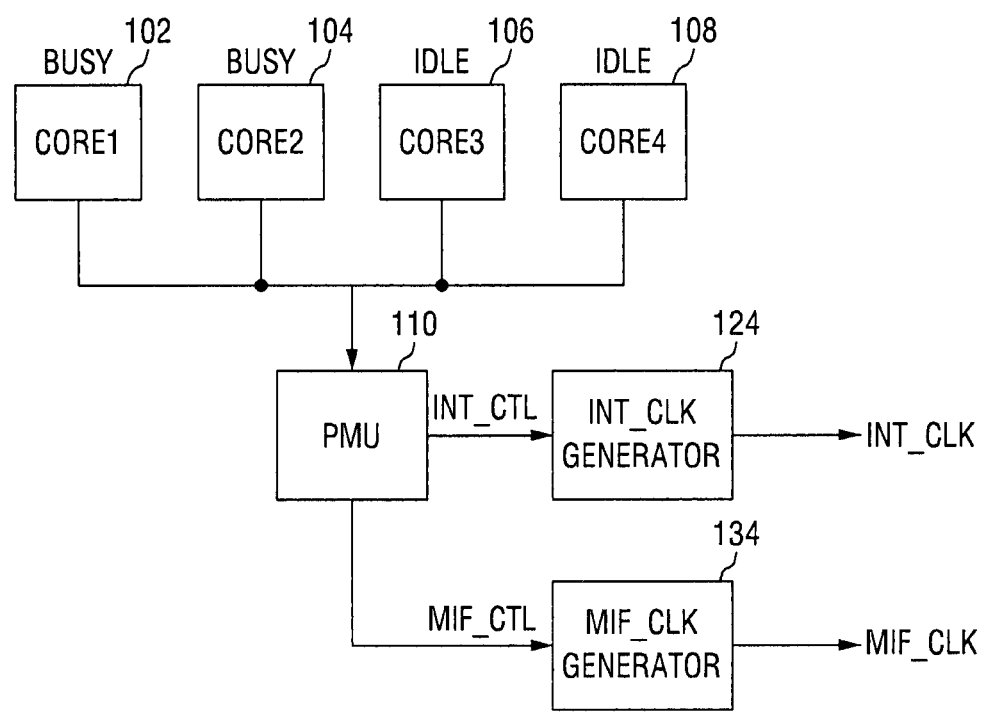
FIG. 7 is a schematic diagram of the operation of an SoC according to another embodiment of the present disclosure.

FIG. 7 is a schematic diagram of the operation of an SoC according to another embodiment of the present disclosure.

Referring to FIG. 7, when operating the SoC according to this embodiment of the present disclosure, a state of each of the plurality of cores 102, 104, 106, and 108 provided on the SoC 10 is examined. In FIG. 7, the first core 102 and the second core 104 are in the busy state, and the third core 106 and the fourth core 108 are in the idle state.

When at least one of the plurality of cores 102, 104, 106, and 108 is not in the idle state, as is the case in FIG. 7, the PMU 110 sends a control signal INT_CTL to INT clock module 120 indicating that the INT clock generating unit 124 should generate the INT clock INT_CLK with the normal clock rate for operating the IPs. For example, if the IPs were previously receiving the INT_MIN_CLK as shown in FIG. 4, the IPs would be restored to operation again by generating the normal INT clock INT_CLK.

Similar to the INT clock generating unit 124, when at least one of the plurality of cores 102, 104, 106, and 108 is not in the idle state, as is the case in FIG. 7, the PMU 110 sends a control signal MIF_CTL to MIF clock module 130 indicating that the MIF clock generating unit 134 should generate the MIF clock MIF_CLK which has the normal clock rate for operating the memory interface 136. For example, if the memory interface 136 was previously receiving the INT_MIN_CLK as shown in FIG. 4, the memory interface 136 would be restored to normal operation again by generating the normal MIF clock MIF_CLK.

Figure 8:
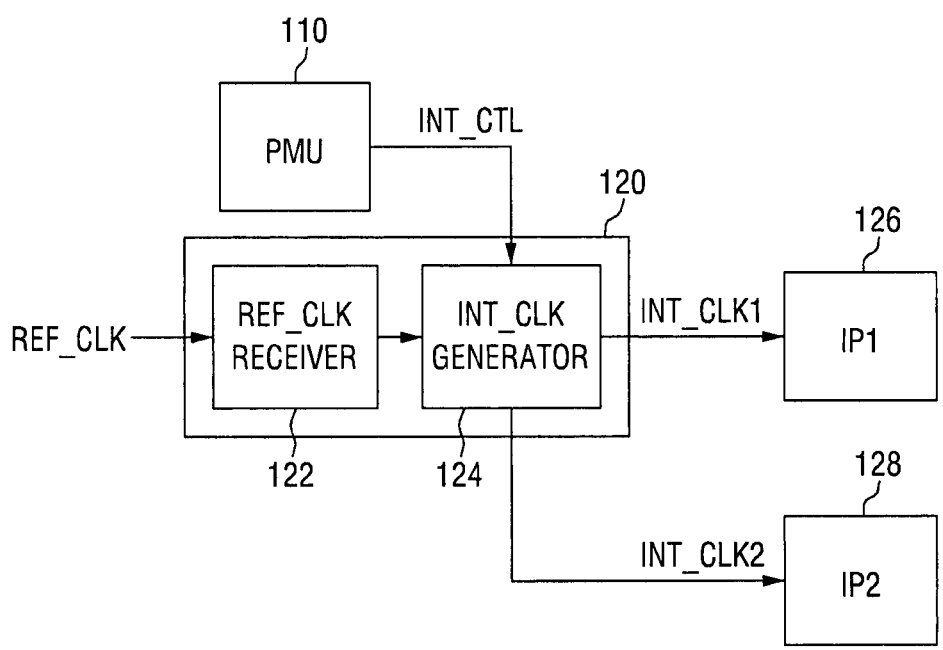
FIG. 8 is a schematic diagram of an INT clock module of an SoC according to another embodiment of the present disclosure.

FIG. 8 is a schematic diagram of an INT clock module of an SoC according to another embodiment of the present disclosure.

Referring to FIG. 8, when operating an SoC according to this embodiment of the present disclosure, a first clock INT_CLK1 and a second clock INT_CLK2 are provided to the first IP 126 and the second IP 128, respectively. Assuming that INT_CLK1 and INT_CLK2 are for normal, i.e., power on, operation, when and if all of the plurality of cores provided on the SoC 10 are in the idle state, a third clock INT_CLK3 and a fourth clock INT_CLK4 would be provided to the first IP 126 and the second IP 128, respectively. The third clock INT_CLK3 and the fourth clock INT_CLK4 may have different clock rates.

In several embodiments of the present disclosure, when the first IP 126 is controlled by a core/processor which is in the idle state and the second IP 128 is controlled by a core/processor which is not in the idle state, the third clock INT_CLK3 having a lower clock rate than that of the first clock INT_CLK1 would drive the idle first IP 126 and the second clock INT_CLK2 would drive the active second IP 128. That is, the PMU 110 and/or INT clock module 120 according to an embodiment of the present invention may drive individual IPs differently, depending on what function and/or core-processor the specific IP is working with. Accordingly, as in the previous example, when some cores/processors on the SoC are in the idle state, the IPs controlled by those cores may receive a lower clock rate INT clock signal than the IPs controlled by the cores/processors which are not in the idle state.

Figure 9:
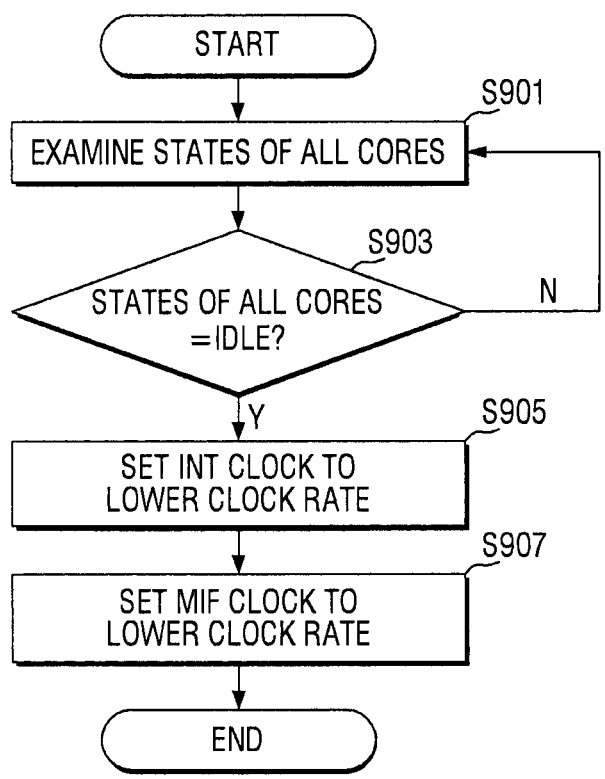
FIG. 9 is a flowchart of a method according to an embodiment of the present disclosure.

FIG. 9 is a flowchart of a method according to an embodiment of the present disclosure.

Referring to the method in FIG. 9 for operating an SoC according to an embodiment of the present disclosure, the states of all of the cores/processors provided on the SoC 10 are examined in step S901. If any one core is in the busy state in step S903 (N), the process loops, i.e., returns to step S901. By contrast, when the states of the all of the cores are in the idle state in step S903 (Y), the INT clock signal for driving the IPs on the SoC 10 is set to a lower clock rate in order to minimize power consumption in step S905. Further, in step S907, the MIF clock signal for driving the memory interface 136 on the SoC 10 is set to a lower clock rate in order to minimize power consumption.

Accordingly, when all of the cores are in the idle state, the SoC 10 enters a standby mode, and at this time, embodiments of the present disclosure make it possible to minimize power consumed in the standby mode.

Figure 10:
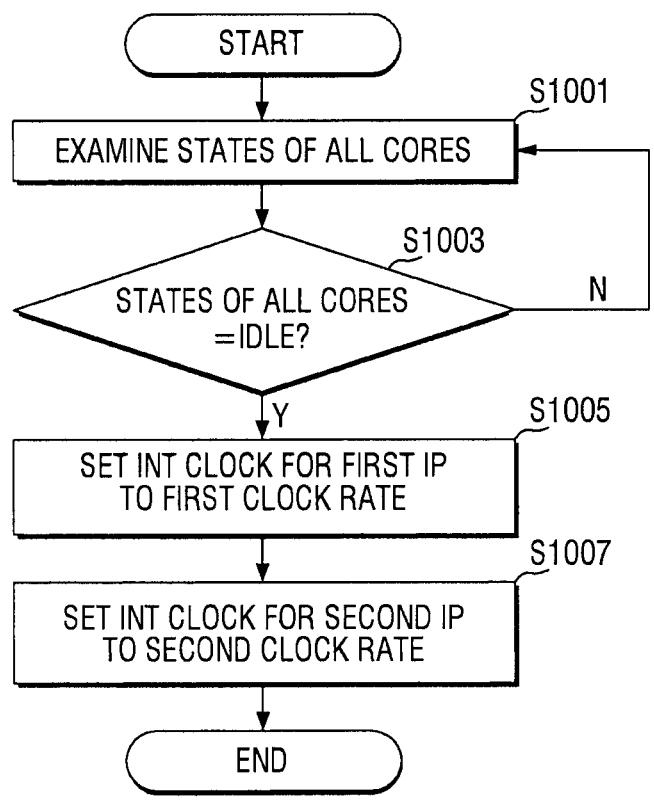
FIG. 10 is a flowchart of a method according to another embodiment of the present disclosure.

FIG. 10 is a flowchart of a method according to another embodiment of the present disclosure.

Referring to the method in FIG. 10 of operating an SoC according to this embodiment of the present disclosure, the states of all of the cores/processors provided on the SoC 10 are examined in step S1001. If any one core is in the busy state in step S903 (N), the process loops, i.e., returns to step S1001. By contrast, when the states of the all of the cores are in the idle state in step S1003 (Y), the INT clock signal driving the first IP 126 is set to a first clock rate in step S1005, and the INT clock signal driving the second IP 128 is set to a second clock rate in step S1007.

In several embodiments of the present disclosure, the first clock rate may be the minimum clock rate for minimizing the standby power of the first IP 126, and the second clock rate may be an original/normal clock rate for operating the second IP 128. In several embodiments of the present disclosure, the first clock rate and the second clock rate may be the minimum clock rates for minimizing the standby power of the first IP 126 and the second IP 128, respectively.

According to the aforementioned various embodiments of the present disclosure, it is possible to improve battery efficiency of a mobile device or a portable device in which an SoC is used by minimizing the standby power consumption of one or more components on the SoC, such as, for example, a mobile SoC, without powering off the SoC.

The foregoing is illustrative of the present disclosure and is not to be construed as limiting thereof. Although a few embodiments of the present disclosure have been described, those skilled in the art will readily appreciate that many modifications of the embodiments are possible without materially departing from the novel teachings and advantages of the present disclosure. Accordingly, all such modifications are intended to be included within the scope of the present disclosure. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present invention is defined solely by the following claims and their equivalents.

What is claimed is:

1. A system on chip (SoC) comprising:
   a plurality of processors including a first processor and a second processor;
   a plurality of intellectual properties (IPs) including a first IP and a second IP;
   a memory interface;
   a reference clock signal generator configured to generate a reference clock signal;
   an internal clock circuit configured to receive the reference clock signal, generate a first internal clock signal, and provide the first internal clock signal to the first IP;
   a memory interface clock circuit configured to receive the reference clock signal, generate a memory interface clock signal, and provide the memory interface clock signal to the memory interface; and
   a power management unit (PMU),
   wherein the first internal clock signal drives the first IP,
   the memory interface clock signal drives the memory interface,
   the PMU generates a first control signal based on operational states of the plurality of processors, and provides the first control signal to the internal clock circuit,
   the PMU generates a second control signal based on the operational states of the plurality of processors, and provides the second control signal to the memory interface clock circuit,
   the internal clock circuit sets a clock rate of the first internal clock signal based on the first control signal, and
   the memory interface clock circuit sets a clock rate of the memory interface clock signal based on the second control signal.

2. The SoC of claim 1, wherein the first processor is configured to control the first IP, and the second processor is associated with the memory interface.

3. The SoC of claim 1, wherein when the operating state of each of the plurality of processors is idle, the first internal clock signal is set to have a first clock rate and the memory interface clock signal is set to have a second clock rate, wherein each of the first clock rate and the second clock rate is a minimum clock rate for minimizing a standby power.

4. The SoC of claim 1, wherein the internal clock circuit is further configured to generate a second internal clock signal based on the reference clock signal, and provide the second internal clock signal to the second IP,
   when the operating state of each of the plurality of processors is idle, the first internal clock signal is set to have a first clock rate, and the second internal clock signal is set to have a third clock rate that is different from the first clock rate.

5. The SoC of claim 4, wherein the first clock rate is a minimum clock rate for minimizing a standby power of the first IP, and the third clock rate is a normal clock rate for operating the second IP.

6. The SoC of claim 1, wherein when at least one of the plurality of processors is not idle, the first internal clock signal with a first clock rate is provided to the first IP controlled by the first processor that is idle, and a second internal clock signal with a third clock rate is provided to the second IP controlled by the second process that is not idle.

7. The SoC of claim 6, wherein the first clock rate is less than the third clock rate.

8. A system on chip (SoC) comprising:
   a plurality of processors including a first processor and a second processor;
   a plurality of intellectual properties (IPs) including a first IP and a second IP;
   a memory interface;
   a power management unit (PMU);
   a reference clock signal generator configured to generate a reference clock signal;
   an internal clock circuit configured to receive the reference clock signal, generate a first internal clock signal, and provide the first internal clock signal to the first IP; and
   a memory interface clock circuit configured to receive the reference clock signal, generate a memory interface clock signal, and provide the memory interface clock signal to the memory interface,
   wherein the first internal clock signal drives the first IP,
   the memory interface clock signal drives the memory interface,
   when an operating state of each of the plurality of processors is idle, the first internal clock signal is set to have a first clock rate that is a minimum clock rate for minimizing a standby power of the first IP.

9. The SoC of claim 8, wherein when the operating state of each of the plurality of processors is idle, the memory interface clock signal is set to have the first clock rate.

10. The SoC of claim 8, wherein the internal clock circuit is further configured to generate a second internal clock signal, and provide the second internal clock signal to the second IP,
    when the operating state of each of the plurality of processors is idle, the first internal clock signal is set to have the first clock rate, and the second internal clock signal is set to have a second clock rate that is different from the first clock rate.

11. The SoC of claim 10, wherein the second clock rate is a normal clock rate for operating the second IP.

12. The SoC of claim 10, wherein the second clock rate is a minimum clock rate for minimizing a standby power of the second IP.

13. The SoC of claim 8, wherein the PMU is configured to generate a first control signal based on the operational states of the plurality of processors, and provide the first control signal to the internal clock circuit, and the PMU is further configured to generate a second control signal based on the operational states of the plurality of processors, and provide the second control signal to the memory interface clock circuit.

14. The SoC of claim 13, wherein the internal clock circuit is further configured to set a clock rate of the first internal clock signal based on the first control signal, and
the memory interface clock circuit is further configured to set a clock rate of the memory interface clock signal based on the second control signal.

15. The SoC of claim 8, wherein when at least one of the plurality of processors is not idle, the PMU is configured to provide a first control signal to the internal clock circuit, wherein the first control signal indicates a normal clock rate.

16. A system on chip (SoC) comprising:
a plurality of processors;
a first intellectual property (IP);
a power management unit (PMU);
a reference clock signal generator configured to generate a reference clock signal; and
an internal clock circuit configured to receive the reference clock signal, generate a first internal clock signal, and provide the first internal clock signal to the first IP,
wherein the PMU is configured to generate a first control signal based on operating states of the plurality of processors, and provide the first control signal to the internal clock circuit,
wherein the first control signal indicates a clock rate for the first internal clock signal, and
the internal clock circuit is further configured to set the clock rate of the first internal clock signal based on the first control signal.

17. The SoC of claim 16, further comprising:
a memory interface; and
a memory interface clock circuit configured to receive the reference clock signal, generate a memory interface clock signal based on the reference clock signal, and provide the memory interface clock signal to the memory interface.

18. The SoC of claim 17, wherein the memory interface clock signal drives the memory interface, and
a clock rate of the memory interface clock signal is set based on the operational states of the plurality of processors.

19. The SoC of claim 16, wherein the operating state of each of the plurality of processors is idle, the first internal clock signal is set to have a minimum clock rate for minimizing a standby power of the first IP.

20. The SoC of claim 16, wherein when at least one of the plurality of processors is not idle, the first internal clock signal is set to have a normal clock rate for operating the first IP.

* * * * *